(12) United States Patent
Glaesser et al.

(10) Patent No.: US 12,168,416 B2
(45) Date of Patent: Dec. 17, 2024

(54) BELT RETRACTOR

(71) Applicant: Autoliv Development AB, Vargarda (SE)

(72) Inventors: Antto-Christian Glaesser, Hasloh (DE); Arndt Söhnchen, Hamburg (DE); Jens Ehlers, Horst (DE); Lennart Pettersson, Vargarda (SE); Bengt Dahlquist, Dalsjöfors (SE); Alexandru Cirstea, Elmshorn (DE); Levi Lennartsson, Vargarda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 298 days.

(21) Appl. No.: 17/633,068

(22) PCT Filed: Jul. 27, 2020

(86) PCT No.: PCT/EP2020/071076
§ 371 (c)(1),
(2) Date: Feb. 4, 2022

(87) PCT Pub. No.: WO2021/023538
PCT Pub. Date: Feb. 11, 2021

(65) Prior Publication Data
US 2022/0266792 A1 Aug. 25, 2022

(30) Foreign Application Priority Data
Aug. 7, 2019 (DE) ...................... 10 2019 211 852.6

(51) Int. Cl.
*B60R 22/46* (2006.01)
(52) U.S. Cl.
CPC .. *B60R 22/4633* (2013.01); *B60R 2022/4638* (2013.01); *B60R 2022/4642* (2013.01)

(58) Field of Classification Search
CPC . B60R 22/46; B60R 22/4628; B60R 22/4633; B60R 2022/4642; B60R 2022/4661; B65H 18/021; B65H 18/0212
See application file for complete search history.

(56) References Cited

U.S. PATENT DOCUMENTS 3,096,957 A * 7/1963 Peterson ................. B60R 22/46
60/632
3,531,061 A * 9/1970 Davies ................ B60R 22/4633
74/89.37

(Continued)

FOREIGN PATENT DOCUMENTS

DE 102007043863 A1 * 3/2009 ......... B60R 22/4628
DE 102010051463 A1 * 5/2012 ......... B60R 22/4628

(Continued)

OTHER PUBLICATIONS

DE-102010051463-A1, Gentner, Note—Patent Merged with translated text. (Year: 2010).*

*Primary Examiner* — Sang K Kim
(74) *Attorney, Agent, or Firm* — DICKINSON WRIGHT PLLC

(57) ABSTRACT

A belt retractor having a belt reel, a safety belt which can be wound thereon to form a wound belt, a pyrotechnic belt tensioner having a drive device which is guided in a tube and can be driven to perform a drive movement, and at least one first further assembly arranged coaxially to the rotational axis of the belt reel and in series with the belt reel, a safety belt which can be wound thereon to form a wound belt, and at least one first assembly, wherein the tube has a straight linear section which extends parallel to the rotational axis of the belt reel and the longitudinal axis of the assembly and is arranged on the side of the belt reel.

11 Claims, 6 Drawing Sheets

(56) References Cited

U.S. PATENT DOCUMENTS

| | | | | |
|---|---|---|---|---|
| 5,924,640 | A * | 7/1999 | Hickey | B60R 22/4628 |
| | | | | 242/374 |
| 6,523,769 | B2 * | 2/2003 | Hamaue | B60R 22/4628 |
| | | | | 280/806 |
| 6,811,186 | B1 * | 11/2004 | Fraley | B60R 22/20 |
| | | | | 297/483 |
| 2004/0021029 | A1 * | 2/2004 | Eberle | B60R 22/46 |
| | | | | 280/806 |
| 2010/0176236 | A1 * | 7/2010 | Clute | B60R 22/4628 |
| | | | | 242/389 |
| 2014/0263808 | A1 | 9/2014 | Wang et al. | |
| 2017/0259782 | A1 | 9/2017 | Sakaguchi et al. | |
| 2018/0162318 | A1 * | 6/2018 | Cho | B60R 22/4633 |

FOREIGN PATENT DOCUMENTS

| | | | | |
|---|---|---|---|---|
| DE | 102017109465 | A1 | 6/2018 | |
| FR | 2928320 | A1 * | 9/2009 | B60R 22/34 |
| WO | WO-2006109106 | A1 * | 10/2006 | B60R 22/32 |
| WO | WO-2018215288 | A1 * | 11/2018 | B60R 22/28 |

* cited by examiner

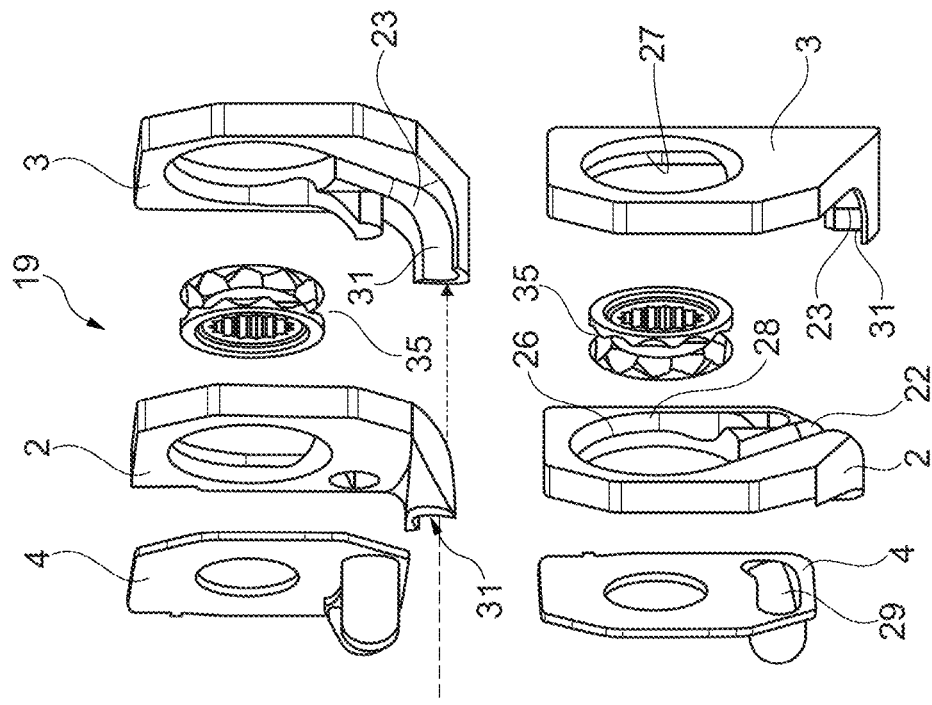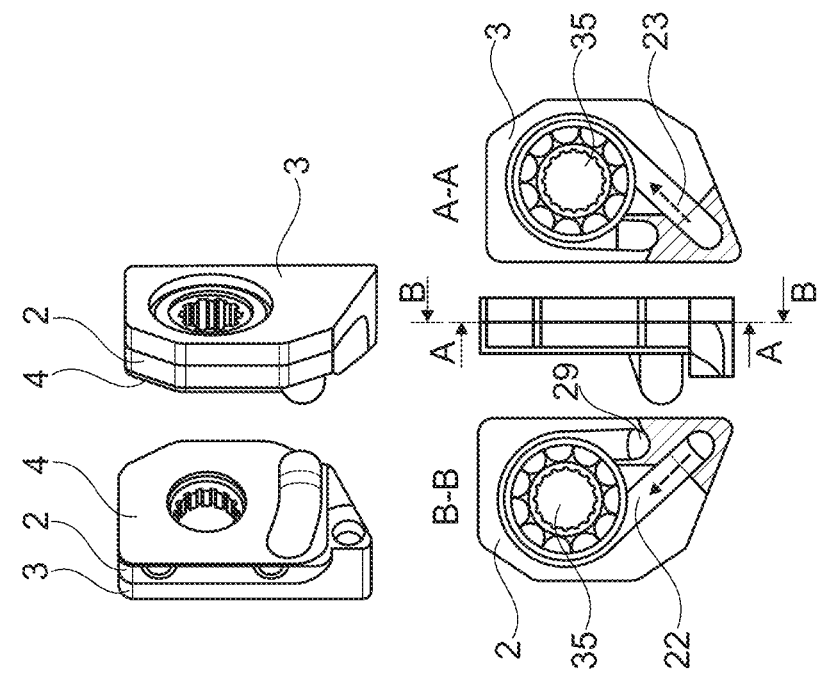
Fig. 3

BELT RETRACTOR

CROSS-REFERENCE TO RELATED APPLICATIONS

This application is a 35 U.S.C. § 371 national phase of PCT International Application No. PCT/EP2020/071076, filed Jul. 27, 2020, which claims the benefit of priority under 35 U.S.C. § 119 to German Patent Application No. 10 2019 211 852.6, filed Aug. 7, 2019, the contents of which are incorporated herein by reference in its entirety.

FIELD

The present invention relates to a belt retractor having the features of the preamble of claim 1 and to a belt retractor having the features of the preamble of claim 2.

BACKGROUND

Belt retractors have as basic components a load-bearing frame and a belt reel which is rotatably mounted in the frame and onto which a safety belt can be wound. The frame serves not only for mounting the belt reel but also for fastening to a seat structure or to a vehicle structure and for this purpose is made of a correspondingly thick steel sheet which is bent into a U-shaped frame.

Vehicle seats having safety belt devices are known, for example, in the use as front seats in convertibles, in which at least the belt retractors of the safety belt devices are fastened in the backrests of the vehicle seats. In this case, due to the lack of a load-bearing B-pillar and for reasons relating to access to the rear seats or for reasons relating to distance from the rear vehicle structure, the belt retractors are preferably integrated into the backrests of the vehicle seats which must therefore also be designed to absorb the tensile forces acting in the case of restraint. The belt retractors themselves comprise all the basic components of a standard belt retractor and are equipped only with various additional subassemblies provided especially for installation in the backrest, such as a self-aligning inertia sensor or a sensor shut-off device.

In its basic design, the vehicle seat has a seat structure consisting of several load-bearing structural parts which serve to fasten the vehicle seat to the vehicle structure. The seat structure is equipped with springs and cushioning in order to improve sitting comfort and is also used for the fastening of further components, such as various seat adjustment mechanisms, including the associated electric motors and further components, such as heating devices, sensors, displays, headrests and the like.

In modern vehicles with autonomous driving systems, there is an increasing demand for greater adjustability of vehicle seats in various orientations and positions so that the vehicle occupant can use the freedom obtained by autonomous driving, for example, for more meaningful communication with the other occupants, for extended and more intensive rest phases or even for work, and can orient the vehicle seat accordingly. As a result, the safety belt device and in particular the belt retractor no longer have to be fastened to the vehicle structure as heretofore but rather to the vehicle seat, as has already been the case, for example, with the front seats of convertibles.

One problem, however, is that the belt retractor, with its further components, has a comparatively large space requirement due to its external dimensions so that installation in the vehicle seat can be problematic. This is due in particular to the fact that for the tensile forces to be absorbed, the safety belt, given a predetermined width of, for example, 46 mm, must have a certain minimum thickness and for the restraint of the occupant a certain minimum length of, for example, 2500 mm, so that when the safety belt is fully wound on, the wound belt on the belt reel has a correspondingly large external diameter due to the volume of the safety belt that is to be wound on. This large wound belt is further enlarged toward the outside by a correspondingly large frame of the belt retractor and by further components, such as a drive device of an irreversible belt tensioner, an electric motor of a reversible belt tensioner, a force-limiting device, sensor devices or the like, thereby once more increasing the installation space requirement.

SUMMARY

Against this background, the invention is based on the object of providing a belt retractor having an irreversible belt tensioner, which can also be arranged in a limited installation space of a vehicle seat.

In order to accomplish the object, a belt retractor having the features of claim 1 and a belt retractor having the features of claim 2 are proposed. Further preferred developments of the invention can be taken from the dependent claims, the figures and the associated description.

According to the basic idea of the invention, it is proposed according to claim 1 that the tube comprises a straight linear section which extends in parallel to the rotational axis of the belt reel and the longitudinal axis of the further subassembly and the length of which is dimensioned in such a way that it extends over the length of the belt reel in the direction of the rotational axis of the belt reel over the length of the further subassembly in the direction of the longitudinal axis and is arranged on the side of the belt reel and of the further subassembly.

Furthermore, according to the basic idea of the invention, it is proposed according to claim 2 that the tube has a straight linear section which extends in parallel to the rotational axis of the belt reel away from the belt reel, wherein the length of the linear section is dimensioned such that it extends over the length of the transmission and the length of the electric motor.

The tube can thereby be arranged in a particularly space-saving manner, whereby the belt retractor can be designed to be particularly compact with the irreversible belt tensioner itself or with the reversible belt tensioner comprising the electric motor and the transmission. Furthermore, due to the particularly long linear section, the drive device can be accelerated particularly effectively and with the lowest possible losses in the initial phase before it is deflected. As a result of the long linear section, the latter can receive more mass elements before the start of the tensioning process, thereby enabling a higher tensioning capacity. This is necessary since, owing to the small wound belt, which is dictated by the particularly compact design of the belt retractor, the coil must carry out more revolutions in order to retract the required quantity of belt webbing.

It is further proposed that the belt retractor comprises at least one web which is arranged perpendicularly to the rotational axis of the belt reel and serves for mounting the belt retractor and/or for receiving further components of the belt retractor. As a result of the web, the belt retractor may be designed to have a greater length, without the mounting being impaired as a result. Furthermore, the web may also alternatively or additionally serve to receive or hold further components.

It is further proposed that the belt retractor has a frame on which the webs are fixed, and that the tube is fixed between the webs and the frame. Together with the frame, the webs form the fixing of the tube which results from the assembly of the belt retractor.

It is further proposed that the web is formed by two or more housing shells. Due to the proposed design of the web, it may have a thicker design, wherein only then do both housing shells make up the web.

For example, the pyrotechnic belt tensioner may comprise a drive wheel which can be driven by the drive device to perform a rotational movement, and the drive wheel may be arranged in a receptacle formed between the two housing shells. The housing shells thus together form the receptacle for the drive wheel so that the drive wheel and the free space provided around it for guiding the drive device, for example, are covered toward the outside during the drive movement. In this way, the assembly can also be simplified by first inserting the drive wheel into the part of the receptacle of a housing shell, and then attaching the other housing shell in order to complete and fix the drive wheel.

Furthermore, the two housing shells may each have partial receptacles which make up one receptacle in which the drive device is guided at least in sections and/or in which the tube is held in sections. In the assembled position, the housing shells thus equally form the holder for the tube and/or a guide for the drive device before and during the engagement movement into the drive wheel. If the housing shells together also form the receptacle for the drive wheel, the proposed solution is of particular advantage since the drive device is thus guided onto the drive wheel in a fixed spatial assignment.

It is further proposed that the tube is curved in a curved section transitioning into the receptacle, and the receptacle is formed tangentially to the curvature of the curved section in a transition section. The tube is held with the curved section in the transition section or is arranged thereon such that the curved section directly adjoins the transition section. The tube and the receptacle practically transition from the curved section into the transition section. Since the transition section is formed tangentially to the curved section, the transition section practically forms an extension of the curved section of the tube, without the curvature for guiding the drive device changing abruptly.

It is further proposed that the drive device is formed by a plurality of loosely abutting mass bodies, and a collecting vessel is provided in which the mass bodies are received after activation of the belt tensioner. The collecting vessel serves to store the mass bodies after passing through the drive wheel, thereby preventing a function of the belt retractor that is to be carried out subsequently from being interrupted by mass bodies moving freely and uncontrollably.

In this case, the collecting vessel may preferably be arranged on the web so that the web is additionally used for holding the collecting vessel. In this case, the collecting vessel may also be integrally formed in the form of a cavity on the web or on one of the housing shells. If the web simultaneously forms the receptacle for the drive wheel and the guide for the drive device, the proposed development is particularly advantageous since the mass bodies are thereby discharged in a fixed spatial assignment into the collecting vessels after passing through the drive wheel. The housing shells or the web thus form a complete guide path for the mass bodies, starting from the supply from the tube via the passage through the drive wheel to the discharge into the collecting vessel.

It is further proposed that the tube has a free end which is oriented in parallel to the rotational axis of the belt reel, wherein a gas generator is held in the free end, or it is proposed that the tube has a free end which is oriented perpendicularly to the rotational axis of the belt reel, wherein a gas generator is held in the free end.

By means of the proposed solutions, the gas generator can be oriented and mounted either in parallel to the rotational axis of the belt reel or also perpendicularly to the rotational axis of the belt reel. As a result, no sharp edges are produced within or on the seat structure, and the arrangement of the belt tensioner allows sufficient distance from the vehicle occupant so that a sufficiently thick cushioning of the vehicle seat is possible between the belt tensioner and the occupant.

BRIEF DESCRIPTION OF THE DRAWINGS

The invention is explained below using preferred embodiments with reference to the accompanying figures. They show:

FIG. 3 is a web composed of two housing parts with a receptacle for a drive wheel in different views.

DETAILED DESCRIPTION

Figure 1:
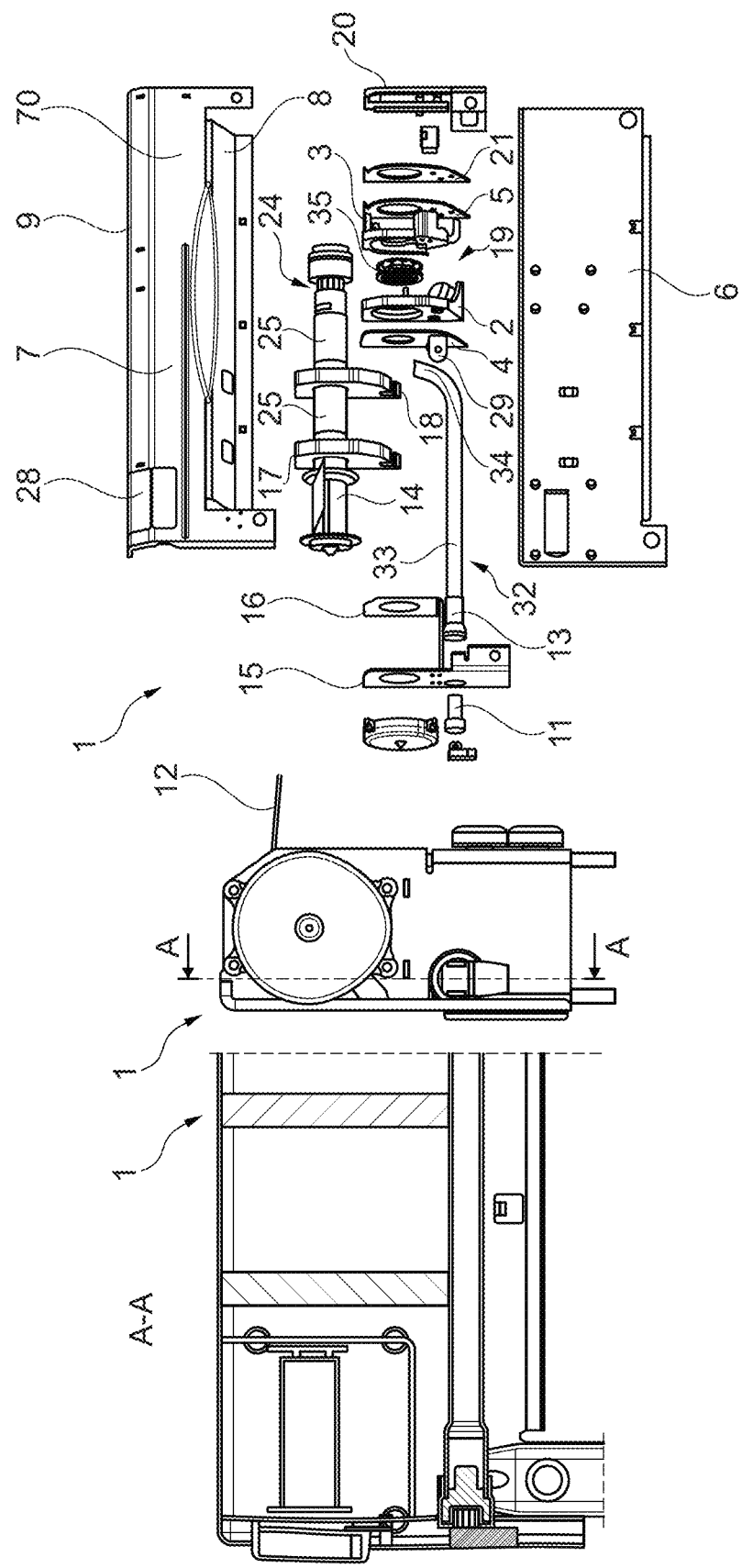
FIG. 1 is a belt retractor according to the invention in individual parts, in a side view and a sectional view.

FIG. 1 shows a belt retractor 1 according to the invention in individual parts and in an assembled state. The belt retractor 1 comprises, as a basic component, a profile rail 7 which is U-shaped in cross-section and has a base face 10 and two opposing wall-shaped side faces 8 and 9 running in parallel to one another and projecting upward from the base face 10. The profile rail 7 has an opening 28 in the base face 10 and in the upper side face 8 in the illustration, through which opening a safety belt 12 that can be seen in the left view is guided out toward the outside. A cavity 21 is formed between the side faces 8, 9 and the base face 10 of the profile rail 7, in which cavity the subassemblies of the belt retractor 1 are arranged and which is closed by an insert part 6. The subassemblies of the belt retractor include a belt reel 14, a force-limiting device 25, an irreversible belt tensioner 24, several webs 15, 16, 17, 18, 19 and 20 and various additional parts, such as further sensors, control units and electrical lines which are not shown in order to better illustrate the invention. Furthermore, a reversible belt tensioner or a belt feeder can additionally be provided. The webs 15, 16, 17, 18, 19 and 20 are supported between the side faces 8, 9, the base face 10 and, when the cavity 21 is closed, on the insert part 6 and form the mounting and holder for the belt retractor 1 or in particular for the belt reel 14 and the further rotating parts.

The external dimensions of the belt reel 14 with the safety belt 12 maximally wound thereon, as well as the external dimensions of the force-limiting device 25 and of the pyrotechnic belt tensioner 24 are selected in the cross-sectional area perpendicular to the rotational axis of the belt reel 14 such that they are not greater than the external dimensions of the wound belt on the belt reel 14 when the safety belt 12 is maximally wound on. Furthermore, the external dimensions are not greater than the dimensions of the cavity 21 perpendicular to the longitudinal extension of the profile rail 7 so that the belt retractor 1 with the subassemblies can be arranged in the cavity 21 of the profile rail 7.

The webs 15, 16, 17, 18, 19 and 20 are designed in the form of wall sections which are oriented perpendicularly to the longitudinal extension of the profile rail 7 and which extend from one of the side faces 8 or 9 to the respective other side face 8 or 9 of the profile rail 7 and are connected thereto. Furthermore, the webs 15, 16, 17, 18, 19 and 20 can extend to the base face 10 of the profile rail 7 and thus fill out the entire cross-sectional area of the profile rail 7. The webs 15, 16, 17, 18, 19 and 20 each have one or more openings or lugs in which the belt retractor 1 or parts thereof, such as the belt reel 14, are mounted, fastened and/or passed through. Furthermore, for example, one of the webs 15, 16, 17, 18, 19 and 20 can also have a toothing or another type of locking design in which the belt reel 14 or other parts of the belt retractor can be locked. The webs 15, 16, 17, 18, 19 and 20 may also have additional cavities for receiving further components of the belt retractor, such as pyrotechnic propellants for the pyrotechnic belt tensioner 24, electronic components, such as sensors, electronic control units or memory devices. If the webs 15, 16, 17, 18, 19 and 20 extend from one of the side faces 8 or 9 to the respective other side face 8 or 9, the webs 15, 16, 17, 18, 19 and 20 can additionally be used for stiffening the profile rail 7, which again is advantageous for load absorption and the dimensional stability of the profile rail 7 in the case of restraint of the occupant. The components of the belt retractor 1 are intentionally arranged coaxially and one behind the other so that the subassemblies do not increase the external dimensions of the belt retractor radially toward the outside, and the belt retractor 1 can also be arranged in the narrow, elongated cavity 21 of the profile rail 7.

In the assembled position, the profile rail 7 together with the insert part 6 forms a frame with an elongated cavity 21 which is square in cross-section. Since the belt reel 14 having the safety belt 12 wound thereon and the further subassemblies are circular in cross-section, an elongated free space, approximately triangular in cross-section, is provided in each case in the corners between the wound belt of the belt reel 14, the subassemblies and the profile rail 7 and the insert part 6 and is used here for the arrangement of a tube 32 of the pyrotechnic irreversible belt tensioner 24. The tube 32 serves to guide a drive device, such as a chain of loosely abutting mass bodies, or an elastic drive train, which is accelerated upon activation of the pyrotechnic belt tensioner 24 and thereby brought into drive connection with a drive wheel 35. The drive wheel 35 is connected to the belt reel 14 in a rotationally secure manner via a toothing or a polygonal profile so that the belt reel 14 is driven by the drive movement via the drive wheel 35 to perform a rotational movement in the winding direction of the safety belt 12, and the safety belt 12 is tightened. The tube 32 has a linear section 33 and a curved section 34 and is oriented and arranged in such a way that it is arranged with the linear section 33 parallel to the rotational axis of the belt reel 14 and the longitudinal axis of the force-limiting device 25. Furthermore, the linear section 33 is dimensioned in length such that it extends, starting from the free end held on the left web 15, on the side of the belt reel 14 and on the side of the force-limiting device 25, and thereby fills a triangular space between the wound belt and the lower side face 8 in the illustration and the insert part 6. The curved section 34 is formed such that the drive device is deflected from the linear movement in the linear section 33 in the direction of a circumferential movement in the drive wheel 35.

Figure 2:
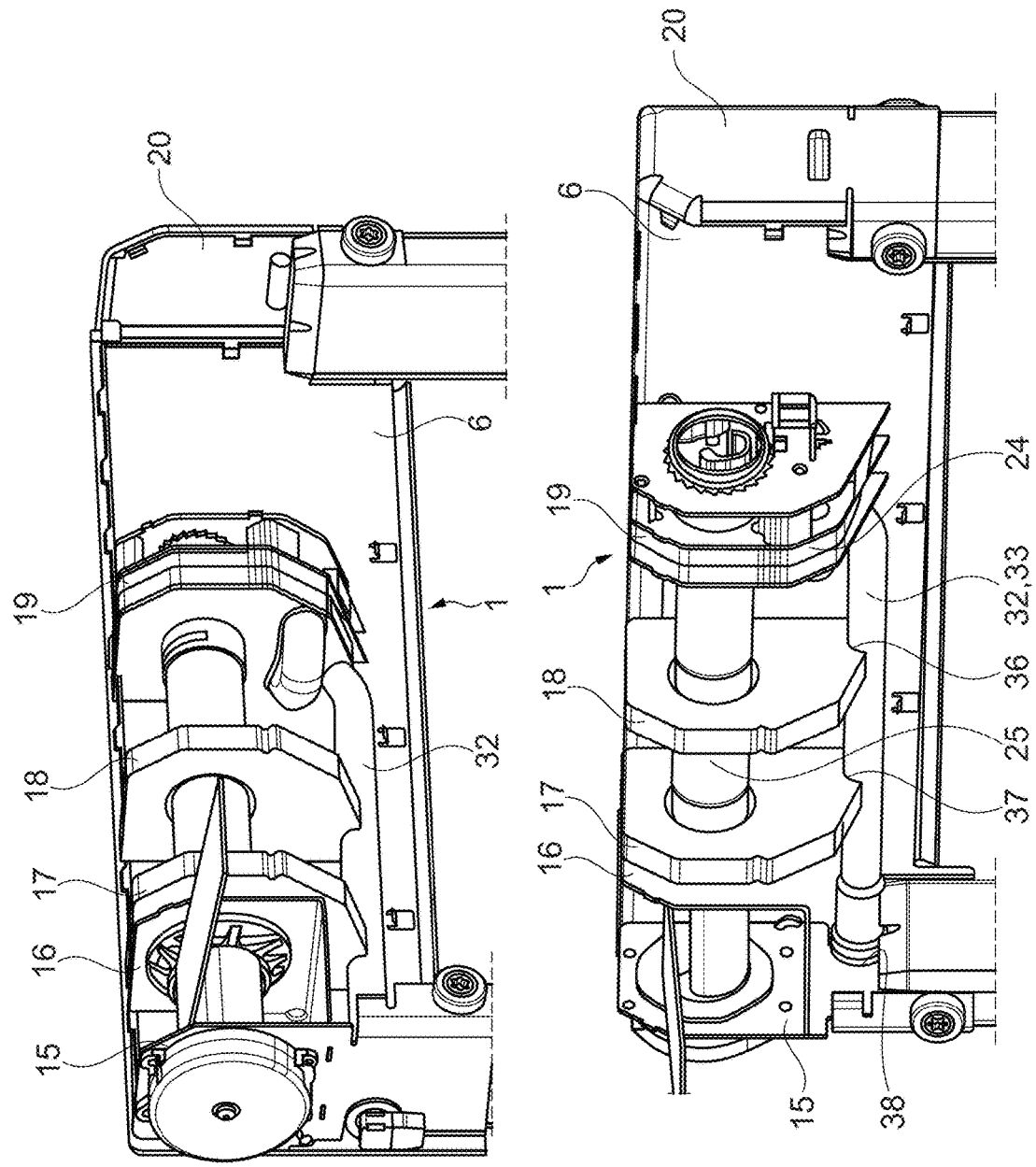
FIG. 2 is the belt retractor from FIG. 1 in the assembled state in two different oblique views.

In the illustrations of FIG. 2, the belt retractor 1 without the profile rail 7 can be seen only with the insert part 6 and the subassemblies. The profile rail 7, which is to be imagined here, and the insert part 6 together form a frame for the belt retractor 1 which covers the subassemblies of the belt retractor 1 toward the outside and forms the holder for the webs 15, 16, 17, 18, 19 and 20. Furthermore, the tube 32 with the linear section 33 is secured in three recesses 36, 37 and 38 of the webs 18, 17 and 15 against lateral slippage and is then covered toward the outside by the frame which is formed by the profile rail 7 to be imagined here. The tube 32 is thereby fixed with the linear section 33 between the webs 18, 17 and 15 and the lower side face 8 of the profile rail 7.

FIG. 3 shows the web 19 in an enlarged representation. The web 19 is formed by two housing shells 2 and 3, each with a cover plate 4 and 5, wherein the cover plate 5 can be seen only in FIG. 1. The housing shells 2 and 3 each have a circular partial receptacle 27 and 28 having a radius which is quadrant-shaped in cross-section and which, in the assembled form of the housing shells 2 and 3, make up a receptacle 26 for the drive wheel 35 with a circumferential guide for the drive device which is semicircular in cross-section. Furthermore, the housing shells 2 and 3 each have a further partial receptacle 22 and 23, which form a guide channel for the drive device in the assembled form of the housing shells 2 and 3. At the inlet side, the partial receptacles 22 and 23 each comprise a curved transition section 31, which is shaped such that the free end of the tube 32 transitions tangentially therein or is held tangentially therein. The transition sections 31 extend from the planes of the housing shells 2 and 3 in the direction of the tube 32 and together form a curved inlet channel with a curvature corresponding to the curvature of the abutting tube 32. In the further course, the partial receptacles 22 and 23 are formed such that they form, in the assembled form, a guide channel which is tangentially directed toward the outer circumference of the drive wheel 35, and form at the outlet side a guide channel which leads tangentially away from the drive wheel 35.

Furthermore, the cover plate 4 on the left of the illustration has a cavity which forms a collecting vessel 29 for receiving the drive device, e.g., the loose mass bodies after the passage through the drive wheel 35. The web 19 thus forms, by means of the assembled housing shells 2 and 3 with the cover plate 4, the receptacle 26 for the drive wheel 35 and, moreover, a complete guide and receptacle of the drive device starting from the exit from the tube 32 to a discharge into the collecting vessel in a fixed spatial assignment to the drive wheel 35.

The housing shells 2 and 3 are realized by means of the partial receptacles 22, 23, 27 and 28 as solid block-like walls with a complex shape and can be realized, for example, in the form of a plastic injection-molded part, while the cover plates 4 and 5 are each formed by a metal stamped part.

Furthermore, a further holding plate 21 is provided on the right cover plate 5, which can be seen in the illustration of FIG. 1, said holding plate 21 likewise being supported on the profile rail 7 and the cover part 6 and serving, inter alia, to hold a vehicle-sensitive sensor.

The linear section 33 of the tube 32 is dimensioned and arranged in length such that it extends in parallel to the rotational axis of the belt reel 14 over the entire longitudinal side of the belt reel 14 and in parallel to the rotational axis or longitudinal axis of the force-limiting device 25 over the entire length of the force-limiting device 25. The length is preferably 7 to 15 cm and enables a very high linear acceleration of the drive device in the initial phase of activation of the irreversible belt tensioner 25 before the drive device engages in the drive wheel 35.

In addition to the described advantageous geometry and arrangement of the tube 32, the guide and receptacle of the drive device and of the drive wheel 35 in the web 19 forms an independent invention. In particular, the proposed guide and receptacle of the drive device and of the drive wheel 35 in the web 19 enable a very precise guiding and orientation of the drive device to the drive wheel 35 due to the fixed spatial assignment. Furthermore, the guide can be realized particularly cost-effectively in that the web 19 is formed from two housing shells 2 and 3 with the partial receptacles 22, 23, 27 and 28 provided therein respectively, for example as a plastic injection-molded part, which partial receptacles then form the receptacle 26 and the guide for the drive wheel 35 and the drive device as a result of the assembling. In the assembled position, the housing shells 2 and 3 form the guide of the drive device to the drive wheel 35, during the passage through the drive wheel 35 and also in the discharging from the drive wheel 35 into the collecting vessel 29. The web 19 with the two housing shells 2 and 3 thus has a thickness which corresponds at least to the width of the drive device. Due to the necessary large width of the web 19, it further additionally forms an increased stiffening of the frame formed by the combination of the profile rail 7 and the insert part 6. In this case, the web 19 comprises all parts of the guide of the drive device, including the collecting vessels 29 and can be preassembled as a subassembly and then inserted into the profile rail 7. The drive wheel 35 then only has to be inserted into the receptacle 26 either in the position already associated with the belt reel 14 or as an individual part.

At its left free end, the tube 32 comprises the gas generator 11 held therein and is fixed with the free end on the left frontal web 15 of the belt retractor 1 against the pull direction from the belt retractor 1 so that the tube 32 is supported on the inside of the web 15 when the gas generator 11 is activated, and the reaction forces are transmitted into the frame of the belt retractor 1.

Figure 4:
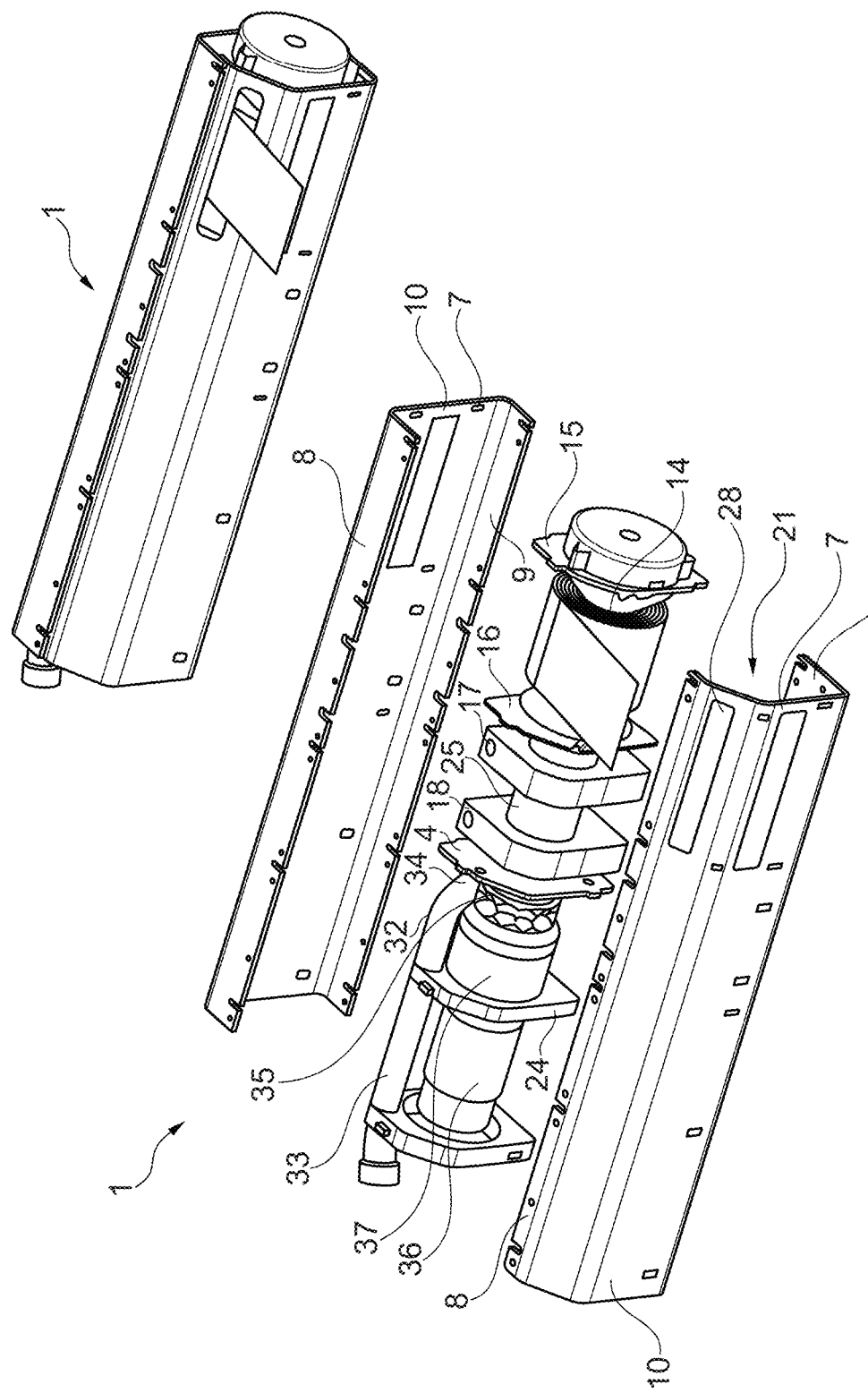
FIG. 4 is a belt retractor according to the invention according to a further embodiment.

FIG. 4 shows a further exemplary embodiment of the invention. In this case, the belt retractor 1 additionally has a reversible belt tensioner with an electric motor 36 and a transmission 37, which in addition can also be designed to realize further functions, such as an adjustment of the retraction force exerted on the belt reel 14 for comfort reasons or also to realize a winding aid of the safety belt in the parking position. The electric motor 36 and the transmission 37 are arranged coaxially and in series with the belt reel 14, whereby a very slim and elongated structure of the belt retractor 1 can be achieved, for example, for an arrangement of the belt retractor 1 in very narrow installation spaces of the vehicle structure or of a vehicle seat. The tube 32 of the irreversible belt tensioner 25 is oriented here such that the linear section 33 extends in parallel to the rotational axis of the belt reel 14 and away from the belt reel 14. In this case, the linear section 33 is dimensioned in length such that it extends on the side of the transmission 37 and of the electric motor 37, utilizing the free space available in the corner of the profile rail 7, and is thus dimensioned to be as long as possible. The drive device guided in the tube 32 is thus accelerated linearly and in a straight line over as long a path as possible before it engages in the drive wheel 35 for the transmission of the drive movement.

Both exemplary embodiments described have in common that the subassemblies of the belt retractor 1, such as belt reel 14, force-limiting device 25 and drive wheel 35, and in the second exemplary embodiment the transmission 37 and the electric motor 36, are arranged coaxially with the rotational axis of the belt reel 14 and in series with the belt reel 14 so that the belt retractor 1 is designed to be as long and as narrow as possible. This advantageous elongated basic structure of the belt retractor 1 is now used to provide the tube 32 with as long a linear section 33 as possible, which is then arranged in parallel to the rotational axis of the belt reel 14 and on the side of the belt reel 14 and a further subassembly, such as the force-limiting device 25, or on the side of the transmission 37 and of the electric motor 37. In this case, a free installation space in one of the corners of the profile rail 7 is advantageously utilized for the arrangement of the linear section 33 of the tube 32.

Figure 5:
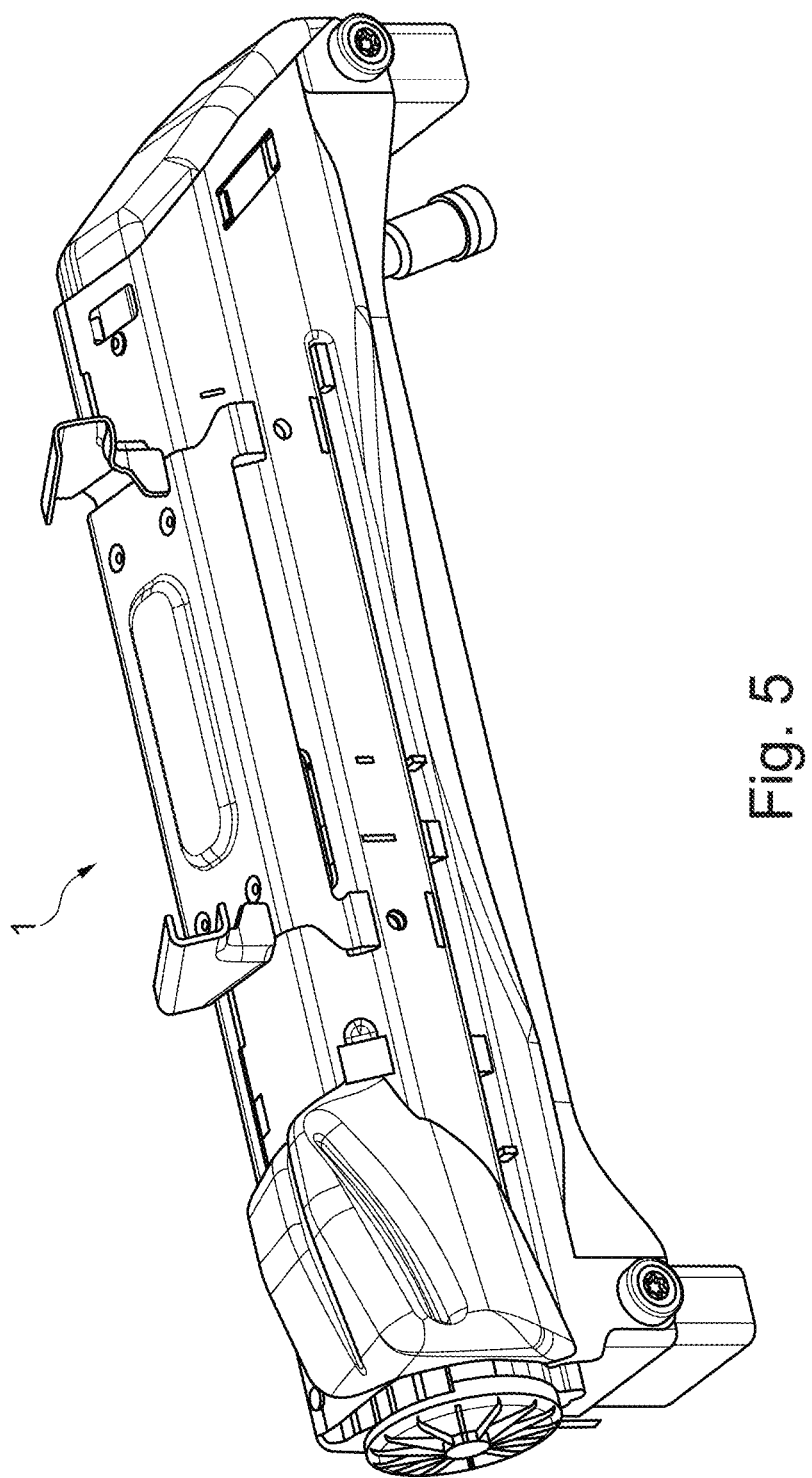
FIG. 5 is a belt retractor according to the invention with a tube according to a further embodiment in the assembled state.
Figure 6:
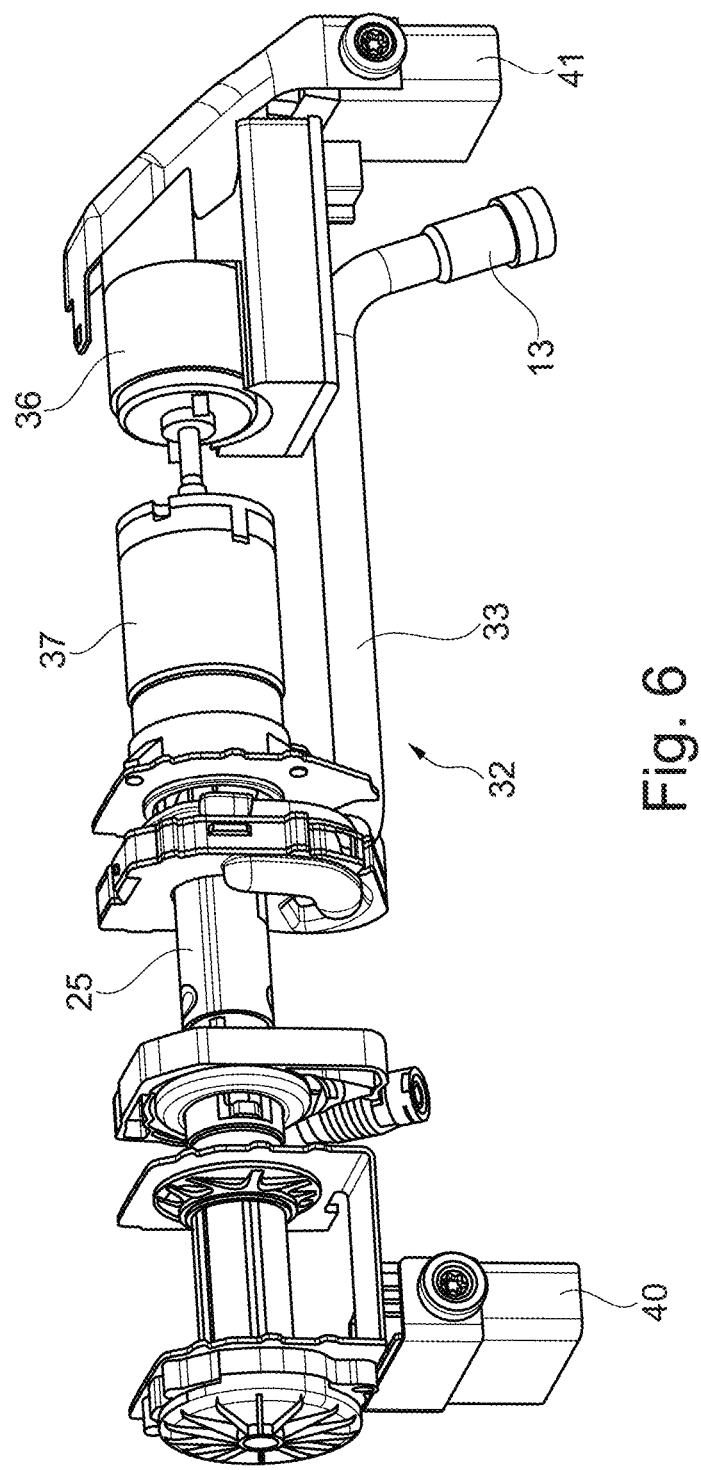
FIG. 6 is the belt retractor of FIG. 5 in the disassembled state with its individual parts.

FIGS. 5 and 6 show a further exemplary embodiment of the invention. In its basic structure, the belt retractor 1 corresponds to the belt retractor 1 shown in FIG. 4, so that, in this respect, reference is made to the description associated with FIG. 4. The embodiment of FIGS. 5 and 6 differs from the embodiment of FIG. 4 in that the free end 13 of the tube 32, in which the gas generator 11 is held, is angled relative to the rotational axis of the belt reel 14 at an angle of approximately 30 to 90 degrees. Furthermore, the belt retractor 1 comprises two fastening lugs 40 and 41, which project perpendicularly to the rotational axis of the belt reel 14 and via which the belt retractor 1 can be fastened to a vehicle seat (not shown). The belt retractor 1 is preferably fastened to the upper side of the vehicle seat via the fastening lugs 40 and 41 so that the safety belt guided out of the belt retractor 1 is supplied to the occupant over the shoulder. The free end 13 of the tube 32 is angled such that it extends radially outward between the fastening lugs 40 and 41 away from the belt retractor 1. The advantage of this solution is that a gas flow potentially escaping is directed into the vehicle seat when the gas generator 11 is activated and does not escape laterally from the vehicle seat, and the occupants are protected from the gas flow.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor, comprising:
   a belt reel,
   a safety belt that can be wound thereon to form a wound belt, and
   a pyrotechnic belt tensioner comprising a drive device which is guided in a tube and can be driven to perform a drive movement, and
   at least a first further subassembly which is arranged coaxially with the rotational axis of the belt reel and in series with the belt reel,
   wherein
   the tube has a straight linear section which extends in parallel to the rotational axis of the belt reel and the longitudinal axis of the first further subassembly, and is arranged on the side of the belt reel and the first further subassembly,
   wherein the linear section is dimensioned in length in such a way that it extends over the length of the belt reel in the direction of the rotational axis of the belt reel and over the length of the first further subassembly in the direction of the longitudinal axis, and wherein the tube has a free end extending and being bent from the straight linear section such that the free end of the tube is angled at 30 to 90 degrees from a longitudinal direction of the rotational axis of the belt reel, and wherein a gas generator is held in the free end.

2. The belt retractor according to claim 1, wherein the belt retractor comprises at least one web which is arranged perpendicularly to the rotational axis of the belt reel and serves for mounting the belt retractor and/or for receiving additional components of the belt retractor.

3. The belt retractor according to claim 2, wherein the belt retractor comprises a frame formed by a profile rail, on which frame the webs are fixed, and the tube is fixed between the webs and the frame.

4. The belt retractor according to claim 2, wherein at least one web is formed by two or more housing shells.

5. The belt retractor according to claim 4, wherein the pyrotechnic belt tensioner comprises a drive wheel which can be driven by the drive device to perform a rotational movement, and the drive wheel is arranged in a receptacle formed between the two housing shells.

6. The belt retractor according to claim 4, wherein the two housing shells each comprise partial receptacles which make up the receptacle in which the drive device is guided at least in sections and/or in which the tube is held in sections.

7. The belt retractor according to claim 6, wherein the tube includes a curved section transitioning into the receptacle, and the receptacle is formed tangentially to the curvature of the curved section in a transition section.

8. The belt retractor according to claim 1, wherein the drive device is formed by a plurality of loosely abutting mass bodies, and a collecting vessel is provided in which the mass bodies are received after activation of an irreversible belt tensioner.

9. The belt retractor according to claim 1, wherein a collecting vessel is arranged on at least one web.

10. The belt retractor according to claim 1, wherein the tube has the free end which is bent perpendicularly to the longitudinal direction of the rotational axis of the belt reel.

11. The belt retractor according to claim 1, wherein the belt retractor comprises two angled fastening lugs which project radially with respect to the rotational axis of the belt reel, and the free end of the tube extends radially outward between the fastening lugs.

* * * * *